(12) United States Patent
Che et al.

(10) Patent No.: US 8,286,047 B2
(45) Date of Patent: Oct. 9, 2012

(54) SOFT BUFFER MEMORY CONFIGURATION IN A COMMUNICATION SYSTEM

(75) Inventors: Xiang Guang Che, Beijing (CN); Asbjorn Grovlen, Frederiksberg (DK); Bernhard Raaf, Neuried (DE); Przemek Czerepinski, Wroclaw (PL)

(73) Assignee: Nokia Corporation, Espoo (FI)

( * ) Notice: Subject to any disclaimer, the term of this patent is extended or adjusted under 35 U.S.C. 154(b) by 750 days.

(21) Appl. No.: 12/409,739

(22) Filed: Mar. 24, 2009

(65) Prior Publication Data

US 2010/0050034 A1 Feb. 25, 2010

Related U.S. Application Data

(60) Provisional application No. 61/038,988, filed on Mar. 24, 2008.

(51) Int. Cl.
*G06F 11/00* (2006.01)

(52) U.S. Cl. .................................................. 714/751

(58) Field of Classification Search .............. 714/748, 714/751
See application file for complete search history.

(56) References Cited

U.S. PATENT DOCUMENTS

| | | | |
|---|---|---|---|
| 2002/0036986 A1* | 3/2002 | Haarsten | 370/235 |
| 2004/0252798 A1 | 12/2004 | Chang et al. | |
| 2005/0220024 A1* | 10/2005 | Agin et al. | 370/235 |
| 2006/0092972 A1* | 5/2006 | Petrovic et al. | 370/469 |
| 2006/0200722 A1* | 9/2006 | Braun | 714/748 |
| 2007/0189231 A1 | 8/2007 | Chang et al. | |
| 2009/0219875 A1* | 9/2009 | Kwak et al. | 370/329 |
| 2010/0226290 A1* | 9/2010 | Kwak et al. | 370/278 |
| 2012/0087396 A1* | 4/2012 | Nimbalker et al. | 375/219 |

FOREIGN PATENT DOCUMENTS

WO 2006035114 A1 4/2006

OTHER PUBLICATIONS

International Search Report and Written Opinion of the International Searching Authority, PCT/IB2009/000514, dated Dec. 18, 2009, 14 pages.
Fujitsu, "Adoption of 2-stage Rate Matching and modified IR-HARQ" 3GPP TSG RAN WG1 #50bis meeting, R1-074184, Shanghai, China, Oct. 8-12, 2007.
Motorola et al., "Proposal for Limited Buffer Rate Matching", 3GPP TSG RAN1#51bis R1-080515, Sevilla, Spain, Jan. 14-18, 2008.
Sadayuki, "LS on CR to TS36.306", 3GPP TSG RAN WG1 Meeting #52 R1-081125, Sorrento, Italy, Feb. 11-15, 2008.
Motorola, "Soft Buffer Size per HARQ Process", 3GPP TSG RAN1 #51bis, R1-080061, Sevilla, Spain, Jan. 14-18, 2008.

(Continued)

*Primary Examiner* — Scott Baderman
*Assistant Examiner* — Yair Leibovich
(74) *Attorney, Agent, or Firm* — Harrington & Smith

(57) ABSTRACT

In accordance with an embodiment of the present invention, an apparatus, comprising a processor configured to determine a total number of soft channel bits, a first number associated with hybrid automatic retransmit request processes and a second number associated with hybrid automatic retransmit request processes; and the processor further configured to select a size of a soft buffer memory partition based at least in part on the total number of soft channel bits, the first number associated with hybrid automatic retransmit request processes and the second number associated with hybrid automatic retransmit request processes, is disclosed.

8 Claims, 10 Drawing Sheets

OTHER PUBLICATIONS

Huawei et al., "Way forward for TDD HARQ process", TSG-RAN WG1 #52 R1-081124, Sorrento, Italy, Feb. 11-15, 2008.

Office Action received in corresponding Korean Application No. 2010-7021721, Dated Oct. 20, 2011, 6 pages.

"3$^{rd}$ Generation Partnership Project; Technical Specification Group Radio Access Network; Evolved Universal Terrestrial Radio Access (E-UTRA); Multiplexing and Channel coding (Release 8)", 3GPP TS 36.212 V8.0.0, Sep. 2007, 30 pgs.

"3$^{rd}$ Generation Partnership Project; Technical Specification Group Radio Access Network; Evolved Universal Terrestrial Radio Access (E-UTRA); Multiplexing and channel coding (Release 8)", 3GPP TS 36.212 V8.20, Mar. 2008, 38 pgs.

"3$^{rd}$ Generation Partnership Project; Technical Specification Group Radio Access Network; Evolved Universal Terrestrial Radio Access (E-UTRA); Physical layer procedures (Release 8)", 3GPP TS 36.213 V8.2.0, Mar. 2008, 30 pgs.

"3$^{rd}$ Generation Partnership Project; Technical Specification Group Radio Access Network; Evolved Universal Terrestrial Radio Access (E-UTRA) User Equipment (UE) radio access capabilities (Release 8)", 3GPP TS 36.306 V8.2.0, May 2008, 13 pgs.

\* cited by examiner

| UE Category | Maximum number of DL-SCH transport block bits received within a TTI | Maximum number of bits of a DL-SCH transport block received within a TTI | Total number of soft channel bits | Maximum number of supported layers for spatial multiplexing in DL |
|---|---|---|---|---|
| Category 1 | [10040] | [10040] | [242,880] | 1 |
| Category 2 | [50000] | [50000] | [1,206,624] | 2 |
| Category 3 | [100000] | [75456] | [1,206,624] | 2 |
| Category 4 | [150112] | [75456] | [1,811,232] | 2 |
| Category 5 | [300064] | [150032] | [3,620,256] | 4 |

FIGURE 5

| UE Category | Maximum number of bits of an UL-SCH transport block transmitted within a TTI | Support for 64QAM in UL |
|---|---|---|
| Category 1 | [5032] | No |
| Category 2 | [25008] | No |
| Category 3 | [50000] | No |
| Category 4 | [50000] | No |
| Category 5 | [75056] | Yes |

FIGURE 6

| DL/UL allocation | Process number |
|---|---|
| 1DL4DwPTS : 3UL | 4 |
| 2DL4DwPTS : 2UL | 7 |
| 3DL4DwPTS : 1UL | 10 |
| 3DL2DwPT : 5UL | 6 |
| 6DL4DwPTS : 3UL | 9 |
| 7DL4DwPTS : 2UL | 12 |
| 8DL4DwPTS : 1UL | 15 |

(5ms periodicity rows: first three; 10ms periodicity rows: last four)

FIGURE 7

| #HARQ processes | 4 | 6 | 7 | 8 | 9 | 10 | 12 | 15 |
|---|---|---|---|---|---|---|---|---|
| min CR (worst case) | 0.333 | 0.500 | 0.583 | 0.667 | 0.750 | 0.833 | 1.000 | 1.250 |

FIGURE 8

SOFT BUFFER MEMORY CONFIGURATION IN A COMMUNICATION SYSTEM

This application claims the benefit of U.S. Provisional Application No. 61/038,988 entitled "Soft Buffer Memory Configuration in a Communication System," filed on Mar. 24, 2008, which is incorporated herein by reference.

TECHNICAL FIELD

The present invention is directed, in general, to communication systems and, more particularly, to an apparatus, system, and method to allocate a soft buffer memory between hybrid automatic retransmit request and multiple input/multiple output processes in a wireless communication system.

BACKGROUND

As wireless communication systems such as cellular telephone, satellite, and microwave communication systems become widely deployed and continue to attract a growing number of users, there is a pressing need to accommodate a large and variable number of communication devices transmitting a growing volume of data over wide cellular areas with fixed resources. Traditional communication system designs have become challenged to provide reliable communication over a reasonably wide geographical area in view of the general need to limit transmitter power and bandwidth for the rapidly growing customer base and expanding levels of service.

The Third Generation Partnership Project Long Term Evolution ("3GPP LTE") project is the name generally used to describe an ongoing effort across the industry to improve the universal mobile telecommunications system ("UMTS") for mobile communication to cope with continuing new requirements and the growing base of users. The goals of this broadly based project include improving communication efficiency, lowering costs, improving services, making use of new spectrum opportunities, and achieving better integration with other open standards. The 3GPP LTE project is not by itself a standard-generating effort, but will result in new recommendations for standards for the UMTS.

In wireless communication systems such as 3GPP LTE cellular communication systems, it is necessary to store data associated with one or more received messages in so-called soft buffer memory that stores the so-called soft information associated with received bits, which is also referred to as soft bits. The soft information for a received bit contains not only the most likely value of the bit, but also a measure of its reliability (e.g., an estimate of the received signal energy relative to a noise level). The term "soft information" or "soft bit" generally refers to not making a hard decision about the value of a bit during demodulation and/or input to a decoder, which is also referred to as a soft decision. These measures of reliability can be used to enhance decoding performance. For example, a decoded received packet and its supporting data (i.e., soft bits) are generally stored in soft buffer memory to accommodate combining the data with retransmitted data in the event that a determination is made that the packet was received in error for a previous transmission or previous retransmission. A hybrid automatic retransmit request ("HARQ") signal requests that the data be retransmitted so that retransmitted data can be combined in the receiver with the originally received packet.

Multiple-input/multiple-output ("MIMO") refers to techniques in wireless communications systems wherein multiple transmit and receive antennas in combination with detectors in a receiver provide time and spatial diversity and spatial multiplexing for a signal reception process. These techniques provide significant enhancements for signals that are ordinarily degraded due to fading (e.g., as a result of multiple paths with unequal transit delays that may exist between a transmitter and a receiver). Furthermore, MIMO allows multiplexing of data on different spatial streams, so called spatial multiplexing, and thus allows in principle an increase in the data rate n-fold if n antennas are deployed at both transmitter and receiver by transmitting n streams concurrently. These concurrent streams are also called MIMO codewords.

The digital structures, particularly in a receiver, that enable HARQ and MIMO processes and their supporting mechanisms require a substantial amount of soft buffer memory for temporary data storage, particularly in the higher-level categories of user equipment that are configured to support multiple concurrent transmission and reception activities. The amount of soft buffer memory that can be required can be substantially greater than a megabyte. Thus, a practical need arises in the design of a wireless transceiver such as a user equipment ("UE") to allocate soft buffer memory between HARQ and MIMO processes.

While it has been contemplated that HARQ memory be partitioned unequally between HARQ processes, some proponents would prefer to provide an equal partition of HARQ memory. The detriment, however, is that equal partitioning of memory offers no hardware advantage, but instead increases UE cost by requiring more HARQ memory than is necessary. The UE memory for HARQ can be quite large, and accordingly substantially influences memory partitioning. It has also been proposed to retain the ability to configure HARQ memory per process, in addition to limited buffer rate matching ("LBRM"), in order to minimize UE memory requirements. Additionally, it is possible to split the soft buffer memory asymmetrically per MIMO codeword (i.e., each MIMO codeword would be associated with a HARQ process). It has also been noted that in view of the small coded payloads associated with voice over internet protocol ("VoIP") in comparison to internet protocol ("IP") packets, that non-equal memory for each HARQ process, independent of the use of LBRM, might be used to minimize overall memory requirements.

Considering the limitations and various conflicting system design directions as described above, a system and method to provide a practical allocation of soft buffer memory between HARQ and MIMO processes is not presently available for the wireless applications that lie ahead. Accordingly, what is needed in the art is a communication system that operates with a practical allocation of soft buffer memory for HARQ and MIMO processes in the operating environments that can be anticipated to be encountered.

SUMMARY OF THE INVENTION

These and other problems are generally solved or circumvented, and technical advantages are generally achieved, by advantageous embodiments of the present invention, which includes a wireless communication system (e.g., including a wireless cellular communication network) configured to allocate soft buffer memory between HARQ and MIMO processes.

In one embodiment, an apparatus (e.g., user equipment) of the wireless communication system is configured to communicate data over a wireless channel with a total number of soft channel bits and a number of configured hybrid automatic retransmit request ("HARQ") processes. The apparatus includes a soft buffer memory, the partitioning of which is determined as a function of the total number of soft channel bits and the number of configured HARQ processes. The apparatus also includes a processor configured to select the size of a soft buffer memory partition to be substantially equal to the total number of soft channel bits divided by the minimum of the number of used HARQ processes and a configured maximum number of HARQ processes ("$M_{limit}$"). In a further embodiment, the apparatus includes a transceiver with multiple-input/multiple-output ("MIMO") capability using MIMO transport blocks, wherein each MIMO transport block includes the same number of soft bits. In an embodiment, the data are transmitted over the wireless channel taking the selected size of the soft buffer memory partitions into account during rate matching. This can be done by using an LBRM scheme and taking the size of the soft buffer memory partition into account for the limitation of the rate-matching scheme. In a further embodiment, the total number of soft channel bits is split into fewer soft buffer memory partitions than the maximum number of HARQ processes (i.e., fewer soft buffer memory partitions are provided than HARQ processes). For multi-stream operation, the number of soft buffer memory partitions may be multiplied by the number of parallel MIMO streams. When such a smaller number of soft buffer memory partitions is selected, data from an initial transmission is discarded if no soft buffer memory partition is available for storage thereof at a certain point in time.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 illustrates downlink physical layer parameter values as set by user equipment category in accordance with the principles of the present invention;

FIG. 6 illustrates the maximum number of bits of an uplink shared channel transport block transmitted within a transmit timed interval as a function of user equipment category in accordance with the principles of the present invention;

FIG. 7 illustrates the number of HARQ processes as a function of periodicity and uplink/downlink allocation in accordance with the principles of the present invention;

FIG. 8 illustrates minimum code rate as a function of a number of HARQ processes in accordance with the principles of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context of allocation of soft buffer memory between HARQ and MIMO processes in a transceiver in a wireless communication system. In general, the invention may be applied to any wireless communication system such as a cellular or ad hoc wireless communication network.

Figure 1:
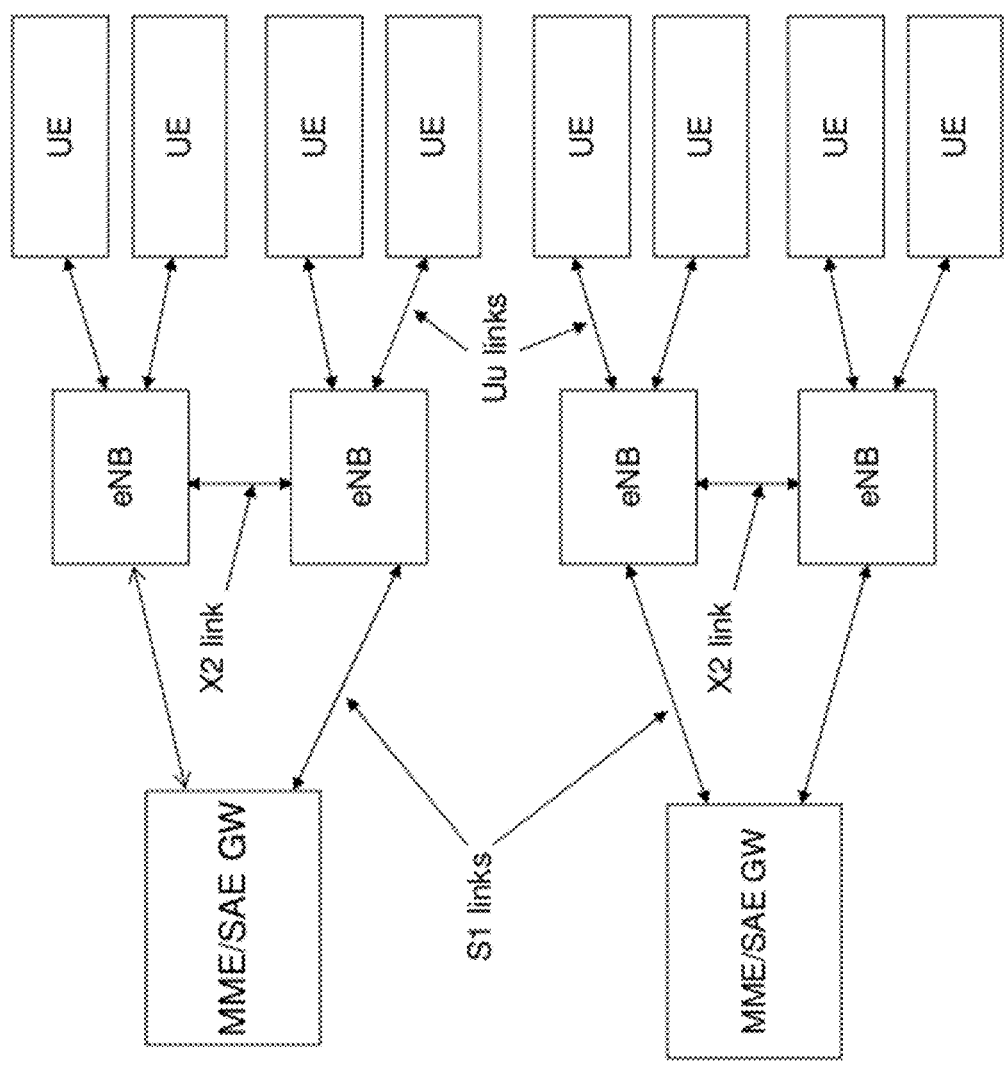
FIGS. 1 and 2 illustrate system level diagrams of a communication system including a wireless communication system that provides an environment for application of the principles of the present invention.

Referring initially to FIG. 1, illustrated is a system level diagram of a communication system including a wireless communication system that provides an environment for the application of the principles of the present invention. Although the communication system illustrated in FIG. 1 represents a cellular communication system, ad hoc wireless communication systems, such as those described by IEEE Standard 802.16, which is incorporated herein by reference, provide another environment for the application of the principles of the present invention. The wireless communication system may be configured to provide evolved UMTS terrestrial radio access network ("e-UTRAN") universal mobile telecommunications services. A mobile management entity ("MME")/system architecture evolution gateway ("SAE GW") provides control functionality for an e-UTRAN node B (designated "eNB," an "evolved node B," also referred to as a "base station") via an SI communication link. The base stations communicate via X2 communication links. The various communication links are typically fiber, microwave, or other high-frequency metallic communication paths such as coaxial links, or combinations thereof.

The base stations communicate with user equipment, which is typically a mobile transceiver carried by a user. Thus, communication links (designated "Uu" communication links) coupling the base stations to the user equipment are air links employing a wireless communication signal such as, for example, an orthogonal frequency division multiplex ("OFDM") signal.

Figure 2:
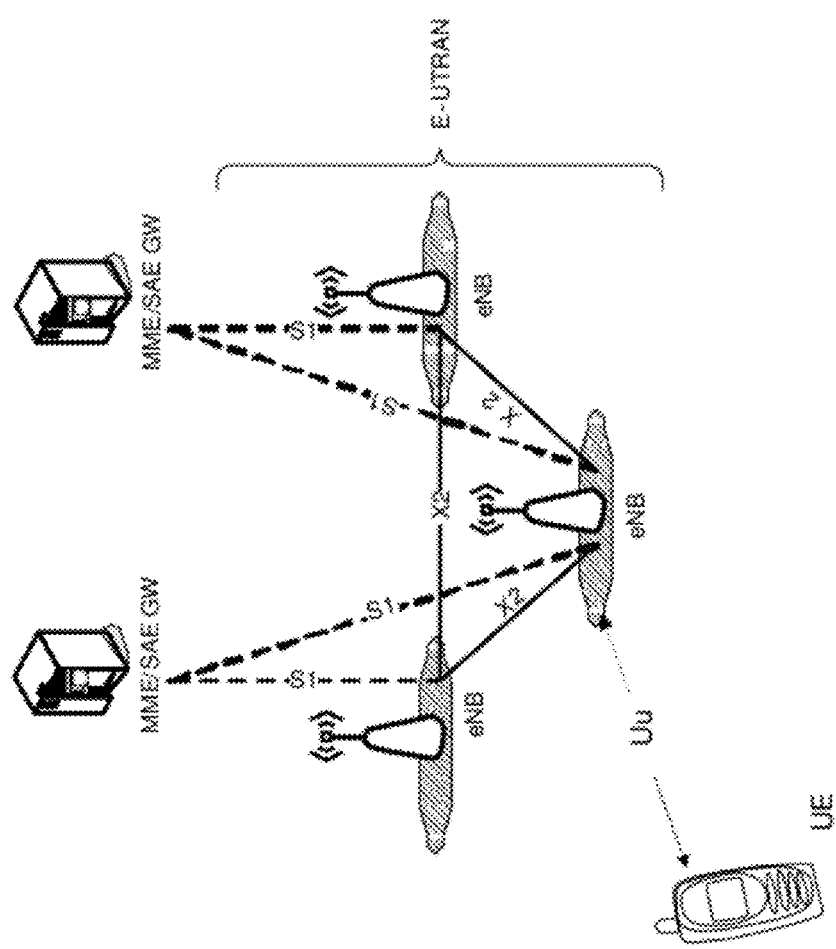

Turning now to FIG. 2, illustrated is a system level diagram of a communication system including a wireless communication system that provides an environment for the application of the principles of the present invention. The wireless communication system provides an e-UTRAN architecture including base stations providing e-UTRAN user plane (packet data convergence protocol/radio link control/media access control/physical) and control plane (radio resource control) protocol terminations towards user equipment. The base stations are interconnected with X2 interfaces or communication links. The base stations are also connected by S1 interfaces or communication links to an evolved packet core ("EPC") including a mobile management entity ("MME")/system architecture evolution gateway ("SAE GW"). The S1 interface supports a multiple entity relationship between the mobile management entity/system architecture evolution gateway and the base stations. For applications supporting inter-public land mobile handover, inter-eNB active mode mobility is supported by the mobile management entity/system architecture evolution gateway relocation via the S1 interface.

The base stations may host functions such as radio resource management (e.g., internet protocol ("IP")) header compression and encryption of user data streams, ciphering of user data streams, radio bearer control, radio admission control, connection mobility control, dynamic allocation of resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway may host functions such as distribution of paging messages to the base stations, security control, termination of U-plane packets for paging reasons, switching of U-plane for support of the user equipment mobility, idle state mobility control, and system architecture evolution bearer control. The user equipment receives an allocation of a group of information blocks from the base stations.

Figure 3:
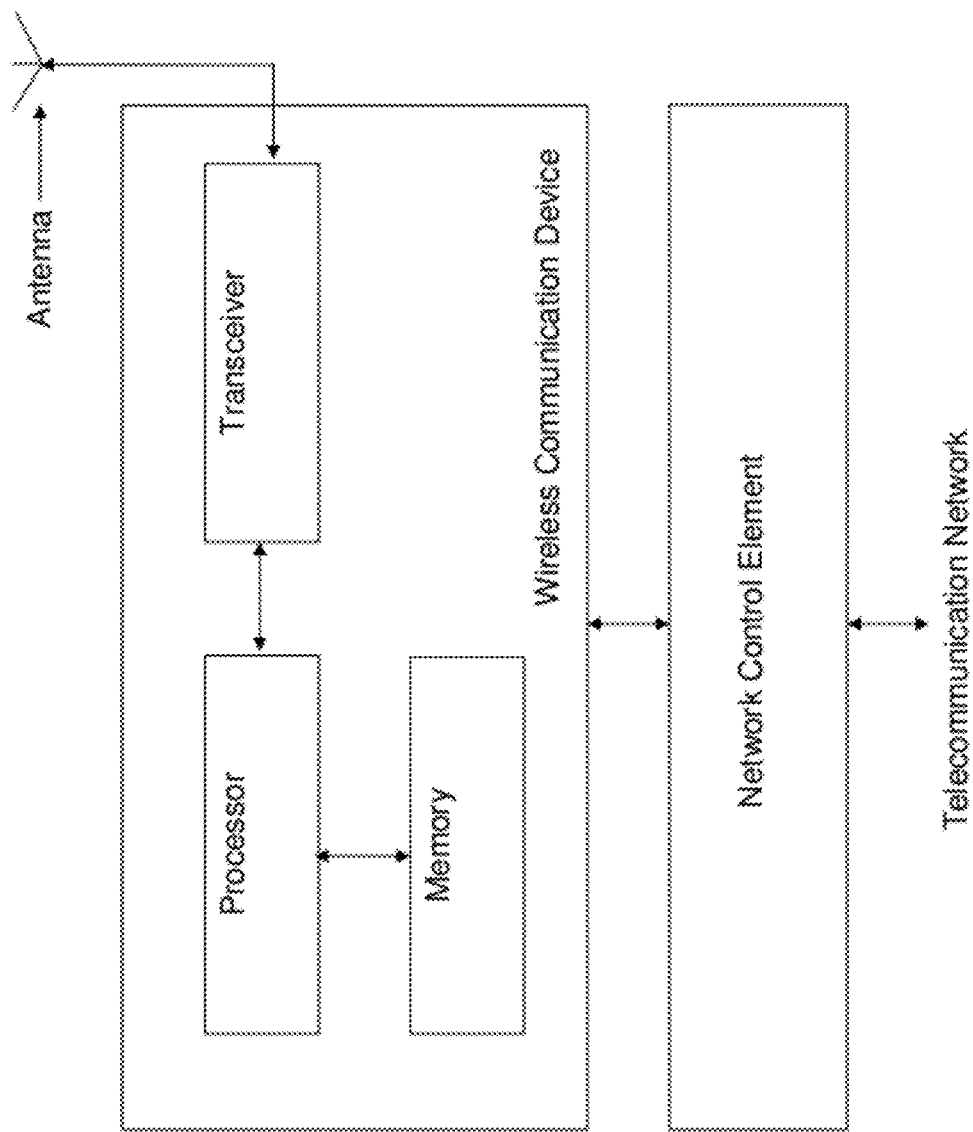
FIG. 3 illustrates a system level diagram of a communication element of a communication system that provides a structure for application of the principles of the present invention.

Turning now to FIG. 3, illustrated is a system level diagram of a communication element of a communication system that provides a structure for application of the principles of the present invention. The communication element or device may represent, without limitation, a base station, user equipment such as a terminal or mobile station, a network control element, communication node, or the like. The communication element includes, at least, a processor, memory that stores programs and data of a temporary or more permanent nature, an antenna, and a radio frequency transceiver coupled to the antenna and the processor for bidirectional wireless communication. The communication element may provide point-to-point and/or point-to-multipoint communication services.

The communication element, such as a base station in a cellular network, may be coupled to a communication network element, such as a network control element of a public switched telecommunication network ("PSTN"). The network control element may, in turn, be formed with a processor, memory, and other electronic elements (not shown). The network control element generally provides access to a telecommunication network such as a PSTN. Access may be provided using fiber optic, coaxial, twisted pair, microwave communication, or similar link coupled to an appropriate link-terminating element. A communication element formed as a mobile station is generally a self-contained device intended to be carried by an end user.

The processor in the communication element, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and equipment, configuration management, end user administration, management of user equipment, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor of the communication element may be of any type suitable to the local application environment, and may include one or more of general-purpose computers, special purpose computers, microprocessors, digital signal processors ("DSPs"), and processors based on a multi-core processor architecture, as non-limiting examples.

The transceiver of the communication element modulates information onto a carrier waveform for transmission by the communication element via the antenna to another communication element. The transceiver demodulates information received via the antenna for further processing by other communication elements.

The memory of the communication element, as introduced above, may be of any type suitable to the local application environment, and may be implemented using any suitable volatile or nonvolatile data storage technology such as a semiconductor-based memory device, a magnetic memory device and system, an optical memory device and system, fixed memory, removable memory, and soft buffer memory. The programs stored in the memory may include program instructions that, when executed by an associated processor, enable the communication element to perform tasks as described herein. Exemplary embodiments of the system, subsystems, and modules as described herein may be implemented, at least in part, by computer software executable by processors of, for instance, the user equipment and the base station, or by hardware, or by combinations thereof. As will become more apparent, systems, subsystems and modules may be embodied in the communication element as illustrated and described above.

Figure 4:
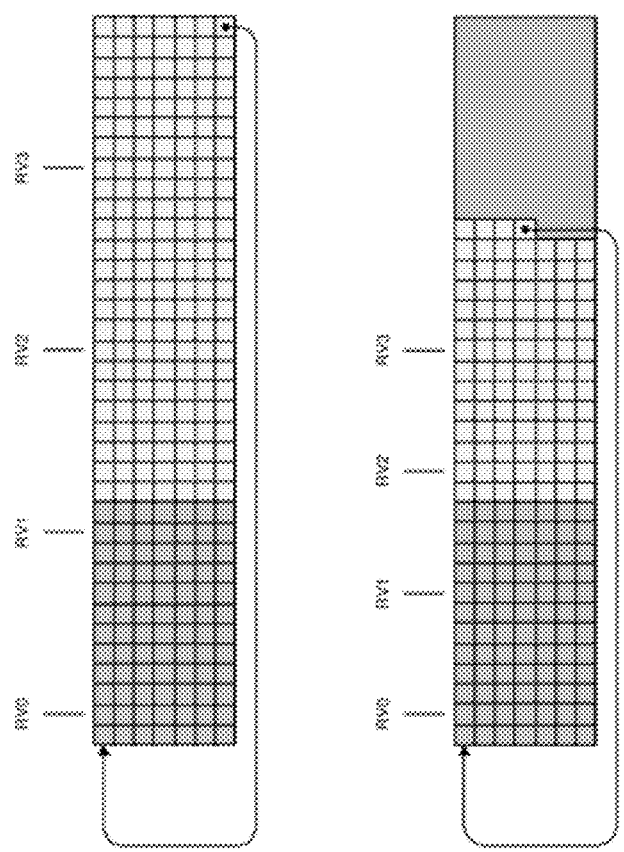
FIG. 4 illustrates full and limited circular buffer rate matching in soft buffer memory in accordance with the principles of the present invention.

In recent contributions to the topic, LBRM algorithms and soft buffer memory sizes for LTE UEs have been addressed. Additionally, full buffer rate matching ("FBRM") may be performed with single-stage rate matching as specified in 3GPP TS 36.212, "3rd Generation Partnership Project; Technical Specification Group Radio Access Network; Evolved Universal Terrestrial Radio Access (E-UTRA); Multiplexing and channel coding (Release 8)," V8.0.0, September 2007, which is incorporated herein by reference, and limited buffer rate matching ("LBRM") may be performed with single-stage rate matching based on the 3GPP specification 36.212 V8.2.0, March 2008, with the exceptions that storage requirements are reduced by enforcing an earlier wrap-around of the virtual circular buffer, wherein a wrap-around point would be calculated based on the available soft buffer memory size, and redundancy version locations are "compressed" to ensure that all redundancy versions ("RVs") are located prior to the wrap-around point. Full and limited circular buffer rate matching are illustrated in FIG. 4, wherein full buffer rate matching is illustrated in the top portion of the FIGURE, and limited buffer rate matching achieved through early wrap-around with RV positions re-defined are illustrated in the bottom portion of the FIGURE.

As further contemplated, downlink physical layer parameter values are set by UE category as illustrated in FIG. 5. The UE category in 3GPP systems, which is typically a number from one to six, generally refers to a level of capability of the UE, for example, the maximum number of MIMO streams and the maximum number of resource blocks that can be supported, HARQ soft buffer memory size, and peak data rate. FIG. 5 illustrates the maximum number of downlink shared channel ("DL-SCH") transport block bits received within a transmission time interval ("TTI"), the maximum number of bits of a DL-SCH transport block received within a TTI, the total number of soft channel bits, and the maximum number of supported layers for spatial multiplexing in the downlink ("DL"), i.e., the maximum number of MIMO streams as a function of UE category. As illustrated in FIG. 5, a substantial number of soft channel bits, often well in excess of $10^6$ soft channel bits, can be required for the various categories of UE, since each soft bit typically requires storage of at least several additional bits to also store the associated reliability of the received bit. Accordingly, this may require substantially more than a megabyte of memory. As illustrated in FIG. 6, the maximum number of bits of an uplink shared channel ("UL-SCH") transport block transmitted within a TTI is illustrated as a function of UE category. Thus, despite the foregoing, it is not known and it is not settled how to practically distribute soft buffer memory between HARQ processes and MIMO streams for the more challenging wireless applications that lie ahead. Additionally, the default soft buffer memory split may be defined by LTE specifications, irrespective of possibly providing an option to reconfigure the soft buffer memory split per HARQ process. This is particularly useful because it can advantageously allow communication effectively to be started before explicitly reconfiguring the soft buffer memory split per HARQ process.

A default allocation of soft buffer memory to HARQ processes is now introduced that can be summarized as set forth below. The soft buffer memory size for a transport block, $N_{IR}$, is applicable to both frequency division duplex ("FDD") and time division duplex ("TDD") modes. It should be noted that according to present LTE specifications, the number of HARQ processes that need to be run concurrently in order to achieve a maximum data rate for FDD is eight times the number of spatial streams. The reason for this is that there is a typical round-trip delay of eight TTIs. The round-trip delay is measured from transmission of a packet, including its detection, and transmission of a receipt acknowledgement or non-acknowledgement for a retransmission of the packet, the detection of this acknowledgement or non-acknowledgement, and the time that is needed until a retransmission can be done. For TDD, the round-trip delay depends on the particular DL/UL resource allocation, and can be as high as fifteen because, due to the nature of TDD, it is not always possible to immediately send an acknowledgement or a retransmission. Such a transmission can be made only when a compatible DL or UL transmission opportunity occurs. Each HARQ process is allocated the same number of soft bits. If MIMO is configured for a UE, each MIMO transport block is allocated the same number of soft bits. The following two parameters describe soft buffer memory usage. The total number of soft channel bits, $N_{soft}$, is defined separately for each UE category and denoted in the following by the symbol $N_{soft}$. The soft buffer memory size, $N_{IR}$, is preferably as signaled per transport block to the rate matching algorithm in order to properly configure the LBRM.

The default linkage between the parameters for soft channel bits $N_{soft}$ and soft buffer memory size $N_{IR}$ is specified as indicated below by equation (1) to ensure that both a base station or eNB and a UE compatibly configure their rate-matching encoding and decoding engines. The following linkage between the parameters for soft channel bits $N_{soft}$ and soft buffer memory size $N_{IR}$, represented below by equation (1), is introduced for a UE, and also for a base station. For TDD terminals with category 3, 4 or 5 defined in 3GPP TS 36.306 (or, in general, whenever the defined total soft buffer memory bits are relatively small compared to the defined number of HARQ processes), the Number_of_processes_to_use_HARQ is preferably selected to lie between eight and twelve. A preferred setting for this parameter is nine as discussed further hereinbelow. The available total soft buffer memory size, the number of MIMO streams, and the round-trip delay determine the proper choice of maximum number of HARQ processes $M_{limit}$. Another preferred setting is eight, because in this case the maximum used code rate would be the same for FDD and TDD, which can simplify implementation, and which also can increase commonalities between FDD and TDD.

The default linkage between the parameters for soft channel bits $N_{soft}$ and soft buffer memory size $N_{IR}$ is specified as indicated below by equation (1).

$$N_{IR} = \left\lfloor \frac{N_{soft}}{\min(K_{MIMO} \cdot M_{DL\_HARQ}, M_{limit})} \right\rfloor \quad (1)$$

$K_{MIMO}$ is the maximum number of transport blocks that may be transmitted to a UE in one TTI. The value two is used if spatial multiplexing with two spatial streams is configured for a UE, four if spatial multiplexing with four spatial streams is configured for a UE, or, in general, n if spatial multiplexing with n spatial streams is configured for a UE. Otherwise, the value one is used. This information is provided to the UE via higher layer signaling, as described in 3GPP TS 36.213, entitled "E-UTRA Physical Layer Procedures," Section 7.1, V.8.2.0, which is incorporated herein by reference.

$M_{DL\_HARQ}$ is the maximum number of DL HARQ processes. The value eight is used for FDD. The values 4, 7, 10, 6, 9, 12, 15 are used for TDD depending on the DL/UL resource allocation. The data illustrated in FIG. 7 provides in the rightmost column the number of HARQ processes as a function of periodicity and uplink/downlink allocation. The maximum number of HARQ processes $M_{limit}$ is a constant equal to 18 in this example, but other values can be chosen as well.

The following further options relate to equation (1) for the case where MIMO is not used, i.e., for the case when $K_{MIMO}=1$. As a first option, the same value can be used for the maximum number of HARQ processes $M_{limit}$ (e.g., $M_{limit}=18$) both for the dual MIMO stream case and for the single stream case. Effectively, however, then for the single stream case the same result will occur as for the setting for the maximum number of HARQ processes $M_{limit}=15$ due to the minimum operation. This occurs because $M_{DL\_HARQ}<15$, i.e., there is no overbooking of the soft buffer memory partitions for each HARQ process for the non-MIMO case, because at most 15 HARQ processes can be active. Accordingly, $M_{DL\_HARQ}<M_{limit}$, so under these assumptions there is never a limitation due to overbooking for the single-stream case.

As an option, half the value can be used for the maximum number of HARQ processes $M_{limit}$, i.e., $M_{limit}=9$ in the single stream case and $M_{limit}=18$ in the dual stream case. In this option there is the advantage that a simplification of the formula is possible, since the maximum number of transport blocks that may be transmitted to a user equipment $K_{MIMO}$ can be removed from the minimum function as shown in equation (2) below. In this case the same value of the maximum number of HARQ processes $M_{limit}$ can be used for both cases.

$$N_{IR} = \left\lfloor \frac{N_{soft}}{K_{MIMO} \cdot \min(M_{DL\_HARQ}, M_{limit})} \right\rfloor \quad (2)$$

In this option, there is the same probability of insufficient memory if the acknowledgment/negative acknowledgment ("ACK/NACK") probability is always correlated for MIMO streams. This may be well the case because both streams are transmitted at the same time, in the same TTI, and therefore are generally affected by the same interference. Both will suffer from a bad detection e.g., if a sudden interference occurs. The lowest code rate in this case for a single stream is 0.375, which is a reasonably low code rate.

As another option, individual values can be assigned for the maximum number of HARQ processes $M_{limit}$, e.g., $M_{limit}=12$ for $K_{MIMO}=1$, and $M_{limit}=18$ for $K_{MIMO}=2$. The advantage here is that the settings can be independently fine tuned for both cases. For example, roughly the same probability of insufficient memory can be set also in the case where the ACK/NACK probability is uncorrelated or at least is not fully correlated for MIMO streams. A medium code rate can be used for a single stream.

Several further comments and remarks can be made regarding the linkage between the parameters for soft channel bits $N_{soft}$ and soft buffer memory size $N_{IR}$ represented by equation (1). UE categories 3, 4, and 5 are mainly considered, although the results also apply to UE categories 1 and 2 with the minimum coding rate scaled to ⅓. An agreed value for the soft channel bits $N_{soft}$ as described in 3GPP TS 36.306, "Evolved Universal Terrestrial Radio Access (E-UTRA); User Equipment (UE) Radio Access Capabilities," V8.2.0, which is incorporated herein by reference, was chosen such that all received bits fit in the UE soft buffer memory at peak data rate on each HARQ process, and when the Number_of_processes_to_use_HARQ is eight, as long as the minimum coding rate cr≦⅔. Equation (1) above conforms to this agreement. Also, when the data rate is lower than peak, or when the maximum number of HARQ processes is lower than eight (for TDD) then it is possible, gradually, to fit all received bits into the soft buffer memory at lower minimum coding rates, leading to incremental redundancy ("IR") or HARQ performance ("IR," soft buffer memory) improvements.

Additionally, when the number of HARQ processes exceeds eight, an attempt to fit all received bits into the soft buffer memory (if $M_{limit}=M_{DL\_HARQ}$) gradually increases the minimum coding rate ("cr"), eventually leading to cr=(⅔)·15/8=1.25 in the case of 15 HARQ processes at peak data rate. Clearly, a coding rate greater than unity is not feasible, which shows that the prior art cannot achieve the maximum data rate in such a case. In an embodiment, by introducing the constant for the maximum number of HARQ processes $M_{limit}$, the minimum coding rate cr is guaranteed not to exceed cr=0.75. Although, in the worst case, not all received bits can fit in the soft buffer memory for all HARQ processes at this coding rate, this is acceptable given the very low probability of all 15 HARQ processes resulting in a NACK, and the benefit of a common memory setting for both FDD and TDD.

The agreed soft buffer memory sizes are dimensioned to fit the received bits at the minimum coding rate of ⅓ for UE categories 1 and 2. For UE categories 3, 4 and 5, all received bits fit into the soft buffer memory at the minimum coding rate of ⅔ in the worst case, corresponding to the largest transport block set size. In this analysis, the focus is on the more critical case of categories 3, 4 and 5. Also, the focus is on the worst case scenario of the UE being scheduled the largest transport block set size. This is also referred to as operating at the peak data rate.

If the soft buffer memory size $N_{IR}$ is set simply as:

$$N_{IR} = \left\lfloor \frac{N_{soft}}{K_{MIMO} \cdot M_{DL\_HARQ}} \right\rfloor,$$

i.e., not according to an embodiment, then the attainable code rate increases with an increasing number of HARQ processes, eventually exceeding one. This is illustrated in FIG. 8. Clearly, with this setting it is not possible to obtain peak data rates in the DL if $M_{DL\_HARQ}$ is equal to 12 or 15, since rate matching will wrap-around before the end of a systematic field, i.e., it is not only not possible to transmit any parity bits, but it is not even possible to transmit all the systematic bits. Accordingly, it is not possible to transmit all the data. Conversely, if $M_{DL\_HARQ}<8$, then a coding rate below ⅔ can be obtained.

On the other hand, some pragmatism is needed when talking about soft buffer memory occupancy at peak data rates. Namely, the soft buffer memory and IR are required only if the first HARQ attempt fails. If this is a frequent occurrence, then essentially the link is not operated at the peak rate. In other words, strictly speaking at peak data rate, there is no need for the soft buffer memory.

Figure 9:
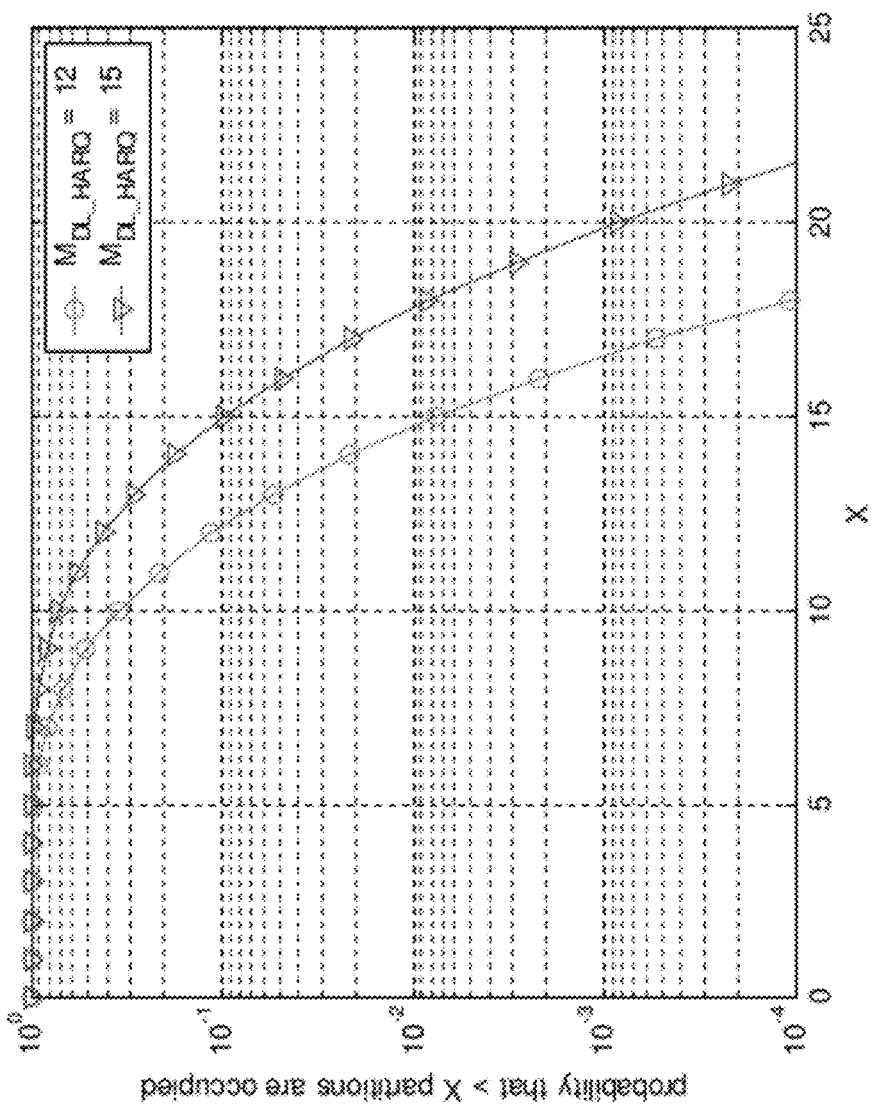
FIG. 9 illustrates graphs showing the probability that more than a number of soft buffer memory partitions are occupied in accordance with the principles of the present invention.

Of course, in practice, some first transmissions will fail and the energy is preserved in the soft buffer memory. However, under reasonable operating conditions, the chance that a large number of transport blocks will fail is very low. This is illustrated in FIG. 9 for $M_{DL\_HARQ}$ equal to 12 and 15, and $K_{MIMO}$ equal to 2. FIG. 9 illustrates graphs showing the probability that more than "X" soft buffer memory partitions are occupied, i.e., the probability that a NACK is generated for more than X transport blocks. A probability of a NACK equal to 0.4 was assumed in constructing the FIGURE. Assuming, then, a NACK probability as high as 0.4, the likelihood that more than 18 transport blocks (out of 24 and 30, respectively) result in a NACK is less than one percent. Given these findings, it is reasonable to overbook the soft buffer memory by setting the soft buffer memory size $N_{IR}$ according to equation (1), enabling identical peak data rates for both FDD and TDD communication modes and simple implementation. According to this analysis the loss of throughput can be expected to be less than one percent, which is easily tolerable, and would be typically less than the gain that is possible by using a lower coding rate. Basically there is a tradeoff in selecting the maximum number of HARQ processes $M_{limit}$. If the maximum number of HARQ processes $M_{limit}$ is selected too low, then only a few soft buffer partitions will be configured, and there is higher risk that soft buffer memory is not available for a HARQ process. This will impact performance if it happens too often. However, if it is selected too high, then at least for high data rates the achievable coding rate is high, and this also impacts performance, particularly for retransmissions because less IR gain is possible. Thus, the value of the maximum number of HARQ processes $M_{limit}$ should be suitably selected. Since the optimum selection also depends on other parameters such as the NACK probability and the coding gain of the specific decoder, it is a pragmatic solution to choose a medium value for $M_{limit}$ that will not necessarily be optimum in each case, but which performs reasonably well.

In a further embodiment, the value of the maximum number of HARQ processes $M_{limit}$ is selected depending on an operating condition, e.g., the base station selects this parameter with appropriate signaling. Then a preferred value can be selected for a given operating scenario. In a further embodiment, several values of the maximum number of HARQ processes $M_{limit}$ are selected depending on the value of the maximum number of transport blocks that may be transmitted to a user equipment $K_{MIMO}$.

Figure 10:
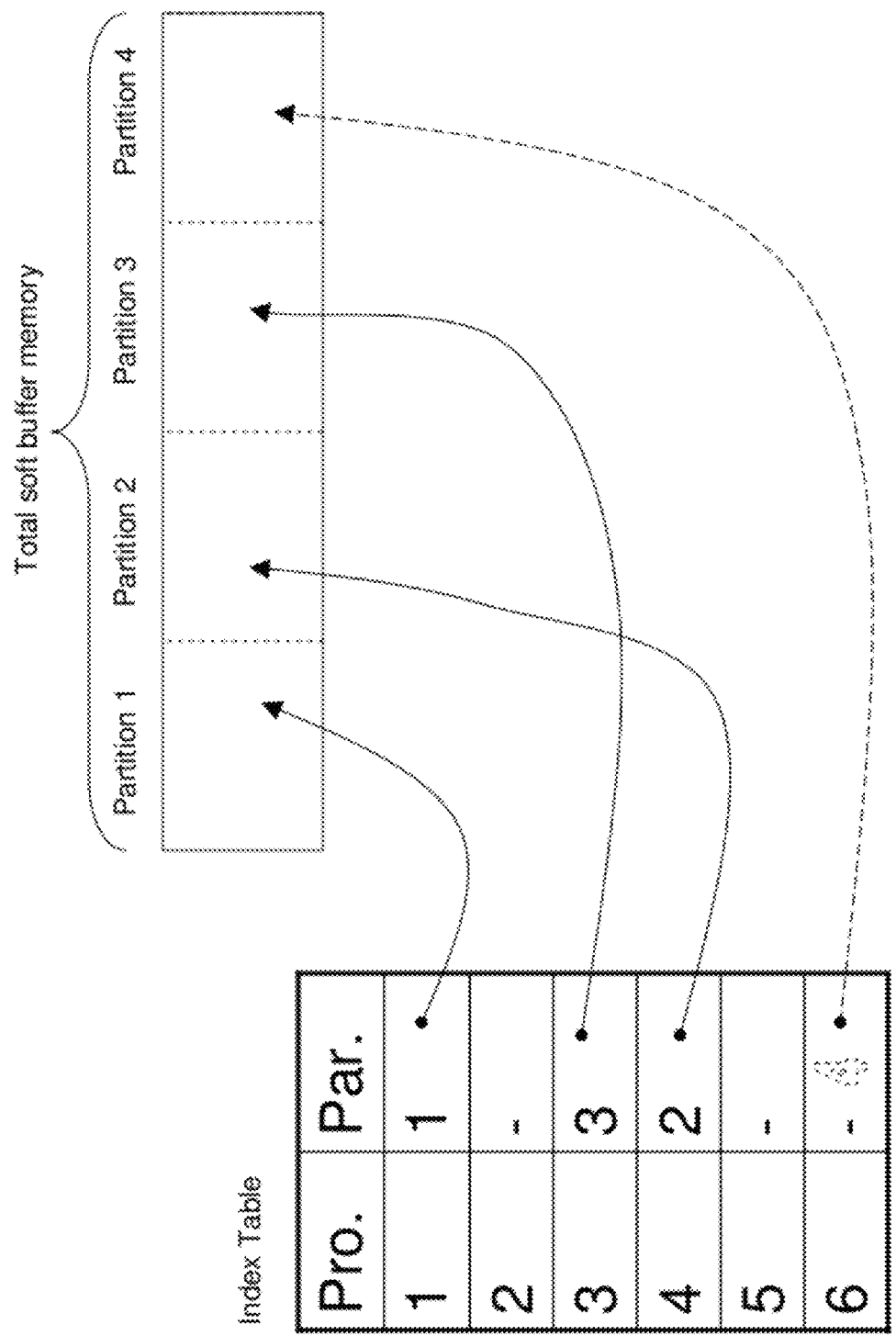
FIG. 10 illustrates a block diagram showing an exemplary implementation of allocation of soft buffer memory to HARQ processes in accordance with the principles of the present invention.

Turning now to FIG. 10, illustrate is a block diagram showing an exemplary implementation of allocation of soft buffer memory to HARQ processes in accordance with the principles of the present invention. It is a particular advantage of the invention to allow easy memory management in a UE and, in particular, not require advanced dynamic memory management. Advanced dynamic memory management may be performed in sophisticated operating systems, but is typically not readily available in embedded computing devices that are typically used for data processing in terminals because complexity and cost is a major concern for such communication elements.

Soft buffer memory is illustrated in the upper right portion of the FIGURE. This soft buffer memory is partitioned into a number of partitions to be used by HARQ processes. This partitioning is shown via the dashed lines. For simplicity, only four partitions are shown in the FIGURE. On the left-hand side is an index table that stores the association between HARQ processes and soft buffer memory partitions. In the example, six HARQ processes are assumed, and the process numbers are shown in the left-hand column of the table. In the right-hand column, an index into the soft buffer memory partition is stored. For example, the first HARQ process in the FIGURE uses the first buffer memory partition, i.e., data from a previous transmission for this HARQ process are stored in the first buffer memory partition. Similarly, HARQ processes number 3 and 4 use soft buffer memory partitions 3 and 2 respectively. This is illustrated by the pointers that point to the respective soft buffer memory partition. If there is a retransmission of data for any of these HARQ processes, then these data can be combined with the data stored in the respective soft buffer memory partition. The other processes, i.e., processes 2, 5, and 6, have not stored any data in the soft buffer memory, either because they have not yet received data, or because it was possible to decode the data sent for these processes the last time, in which case there is no need to store any more soft bits in the soft buffer memory. Instead, the decoded packet is forwarded to higher layers. This is indicated by the dashes "-" in the corresponding right-hand column of these rows.

FIG. 10 also illustrates the case where another process has to store data because decoding failed. In this example, it is assumed that process 6 needs to store data. In this case a free soft memory partition, in this case soft buffer memory partition 4, is associated with that process as indicated by the dashed entry "4" in the last row of the index table and illustrated by the dashed pointer.

If yet another process needs to store data in the soft buffer memory, e.g., process 2, it is determined that no soft buffer memory portion is free and the soft data is accordingly discarded. However, as soon as a process decodes a retransmission, the corresponding soft buffer memory becomes available and is no longer associated with a process. This is marked by a "-" in the table. Subsequently, that buffer is available for any process to store data.

It will be apparent that an implementation according to FIG. 10 is only an example and various other implementations can be designed within the broad scope of the present invention. In particular, a table can be formed that is substantially the inverse of the table illustrated in the FIGURE, i.e., a table that stores for each soft buffer memory partition whether it is available or is associated with a process, and, in the latter case, also includes the process number.

Thus, an apparatus, system, computer program, and related method to allocate soft buffer memory between HARQ and MIMO processes in a wireless communication system have been introduced. In an embodiment, an apparatus such as a user equipment includes a soft buffer memory that can be formed into several partitions, and a processor coupled to the soft buffer memory. The apparatus communicates with a base station over a wireless channel using a number of soft buffer memory partitions that are selected according to an embodiment, and a number of HARQ processes. The processor selects the number of soft buffer memory partitions to be used for HARQ processes to be used to communicate with the base station. In an embodiment, the processor selects the size of the soft buffer memory partitions to be substantially equal to the total number of soft channel bits divided by the minimum of the number of used HARQ processes and the number of HARQ processes. In a further embodiment, the processor selects a soft buffer memory partition size substantially equal to the smallest integer at least as great as the total number of soft channel bits divided by the minimum of the number of used HARQ processes and the number of configured HARQ processes. In an embodiment, the processor selects the soft buffer memory partition size for both frequency division duplex and time division duplex communication modes. In an embodiment, the processor allocates the same number of soft bits to each used HARQ process. In a further embodiment, the processor allocates the same number of soft bits to each configured HARQ process. In another embodiment, the apparatus includes a transceiver with MIMO capability using MIMO transport blocks, wherein each MIMO transport block includes the same number of soft bits.

It should be noted further that embodiments have been described herein primarily from the perspective of a receiving station, in particular, a receiving terminal. However, it will be apparent to those well skilled in the art that the invention is also applicable to a transmitting station. Both transmitting and receiving stations have to set the parameter soft buffer memory size $N_{IR}$ in a compatible way in order to allow data to be sent and correctly received. If a transmitter and a receiver do not select the same value, they will assume a different wrap-around for the LBRM and incompatibly select redundancy versions. This would likely cause severe performance degradation, and may even render certain data transfers impossible. Basically, a transmitter and a receiver should mirror the other station's behavior in their implementation to assure satisfactory communication. Mirroring operations in this sense includes, e.g., decoder and encoder, interleaving and de-interleaving, modulation and demodulation, and rate matching, i.e., picking a subset of the data vs. associating the transmitted subset of the data with the correct part of the total data. Thus, a transmitter sets the soft buffer memory size $N_{IR}$ according to the present invention in order to allow optimum usage of the available total soft buffer memory in the receiver. It is also apparent that base stations and terminals, and even intermediate stations such as relays that forward data, can operate as receiving and transmitting stations, and can apply the respective procedures of the present invention.

Also, although the present invention and its advantages have been described in detail, it should be understood that various changes, substitutions and alterations can be made herein without departing from the spirit and scope of the invention. For example, many of the processes discussed above can be implemented in different methodologies and replaced by other processes, or a combination thereof, to allocate soft buffer memory between HARQ and MIMO processes in a wireless communication system as described herein.

As described above, the exemplary embodiment provides both a method and corresponding apparatus consisting of various modules providing functionality for performing the steps of the method. The modules may be implemented as hardware (including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention.

We claim:

1. An apparatus, comprising:
a processor configured to determine a total number of soft channel bits, a first number associated with hybrid automatic retransmit request processes and a second number associated with hybrid automatic retransmit request processes; and
the processor further configured to select a size of a soft buffer memory partition based at least in part on the total number of soft channel bits, the first number associated with hybrid automatic retransmit request processes and the second number associated with hybrid automatic retransmit request processes;
wherein the first number associated with hybrid automatic retransmit request processes comprises a maximum number of downlink hybrid automatic retransmit request processes and the second number associated with hybrid automatic retransmit request processes comprises a configured maximum number of hybrid automatic retransmit request processes; and
wherein the size of the soft buffer memory partition is selected based at least in part on the following:

$$N_{IR} = \left\lfloor \frac{N_{soft}}{K_{MIMO} \cdot \min(M_{DL\_HARQ}, M_{limit})} \right\rfloor$$

Wherein $N_{IR}$ is the size of the soft buffer memory partition;
$N_{soft}$ is the total number of soft channel bits;
$K_{MIMO}$ is the maximum number of transport blocks transmittable to a user equipment in one transmission time interval;
$M_{DL\_HARQ}$ is the maximum number of downlink hybrid automatic retransmit request processes; and
$M_{limit}$ is the configured maximum number of hybrid automatic retransmit request processes.

2. The apparatus according to claim 1, wherein the total number of soft channel bits is determined based at least in part on a user equipment category, the first number associated with hybrid automatic retransmit request processes is determined based at least in part on duplex mode; the second number associated with hybrid automatic retransmit request processes is determined based at least in part on a number of Multiple Input Multiple Output streams, round-trip delay, and/or a maximum number of transport blocks transmittable to a user equipment in one transmission time interval.

3. The apparatus according to claim 1, wherein said apparatus is part of at least one of a base station and a user equipment.

4. An apparatus, comprising:
a processor configured to determine a total number of soft channel bits, a first number associated with hybrid automatic retransmit request processes and a second number associated with hybrid automatic retransmit request processes; and
the processor further configured to select a size of a soft buffer memory partition based at least in part on the total number of soft channel bits, the first number associated with hybrid automatic retransmit request processes and the second number associated with hybrid automatic retransmit request processes;
wherein the first number associated with hybrid automatic retransmit request processes comprises a maximum number of downlink hybrid automatic retransmit request processes and the second number associated with hybrid automatic retransmit request processes comprises a configured maximum number of hybrid automatic retransmit request processes; and
wherein the size of the soft buffer memory partition is selected based at least in part on the following:

$$N_{IR} = \left\lfloor \frac{N_{soft}}{\min(K_{MIMO} \cdot M_{DL\_HARQ}, M_{limit})} \right\rfloor$$

Wherein $N_{IR}$ is the size of the soft buffer memory partition;
$N_{soft}$ is the total number of soft channel bits;
$K_{MIMO}$ is the maximum number of transport blocks transmittable to a user equipment in one transmission time interval;
$M_{DL\_HARQ}$ is the maximum number of downlink hybrid automatic retransmit request processes; and
$M_{limit}$ is the configured maximum number of hybrid automatic retransmit request processes.

5. A computer-executable method, comprising:
determining a total number of soft channel bits, a first number associated with hybrid automatic retransmit request processes and a second number associated with hybrid automatic retransmit request processes; and
selecting a size of a soft buffer memory partition based at least in part on the total number of soft channel bits, the first number associated with hybrid automatic retransmit request processes and the second number associated with hybrid automatic retransmit request processes;
wherein the first number associated with hybrid automatic retransmit request processes comprises a maximum number of downlink hybrid automatic retransmit request processes and the second number associated with hybrid automatic retransmit request processes comprises a configured maximum number of hybrid automatic retransmit request processes; and
wherein the size of the soft buffer memory partition is selected based at least in part on the following:

$$N_{IR} = \left\lfloor \frac{N_{soft}}{K_{MIMO} \cdot \min(M_{DL\_HARQ}, M_{limit})} \right\rfloor$$

Wherein $N_{IR}$ is the size of the soft buffer memory partition;
$N_{soft}$ is the total number of soft channel bits;
$K_{MIMO}$ is the maximum number of transport blocks transmittable to a user equipment in one transmission time interval;
$M_{DL\_HARQ}$ is the maximum number of downlink hybrid automatic retransmit request processes; and
$M_{limit}$ is the configured maximum number of hybrid automatic retransmit request processes.

6. The computer-executable method according to claim 5, wherein the total number of soft channel bits is determined based at least in part on a user equipment category, the first number associated with hybrid automatic retransmit request processes is determined based at least in part on duplex mode; the second number associated with hybrid automatic retransmit request processes is determined based at least in part on a number of Multiple Input Multiple Output streams, round-trip delay, and/or a maximum number of transport blocks transmittable to a user equipment in one transmission time interval.

7. A computer program embodied on a non-transitory computer-readable medium, the computer program configured to control a processor to perform a method comprising:
determining a total number of soft channel bits, a first number associated with hybrid automatic retransmit request processes and a second number associated with hybrid automatic retransmit request processes; and
selecting a size of a soft buffer memory partition based at least in part on the total number of soft channel bits, the first number associated with hybrid automatic retransmit request processes and the second number associated with hybrid automatic retransmit request processes;
wherein the first number associated with hybrid automatic retransmit request processes comprises a maximum number of downlink hybrid automatic retransmit request processes and the second number associated with hybrid automatic retransmit request processes comprises a configured maximum number of hybrid automatic retransmit request processes; and
wherein the size of the soft buffer memory partition is selected based at least in part on the following:

$$N_{IR} = \left\lfloor \frac{N_{soft}}{K_{MIMO} \cdot \min(M_{DL\_HARQ}, M_{limit})} \right\rfloor$$

Wherein $N_{IR}$ is the size of the soft buffer memory partition;
$N_{soft}$ is the total number of soft channel bits;
$K_{MIMO}$ is the maximum number of transport blocks transmittable to a user equipment in one transmission time interval;
$M_{DL\_HARQ}$ is the maximum number of downlink hybrid automatic retransmit request processes; and
$M_{limit}$ is the configured maximum number of hybrid automatic retransmit request processes.

8. The computer program according to claim 7, wherein the total number of soft channel bits is determined based at least in part on a user equipment category, the first number associated with hybrid automatic retransmit request processes is determined based at least in part on duplex mode; the second number associated with hybrid automatic retransmit request processes is determined based at least in part on a number of Multiple Input Multiple Output streams, round-trip delay, and/or a maximum number of transport blocks transmittable to a user equipment in one transmission time interval.

\* \* \* \* \*